(No Model.) 2 Sheets—Sheet 2.
J. G. TOURANGEAU.
DOUGH KNEADING MACHINE.
No. 342,147. Patented May 18, 1886.
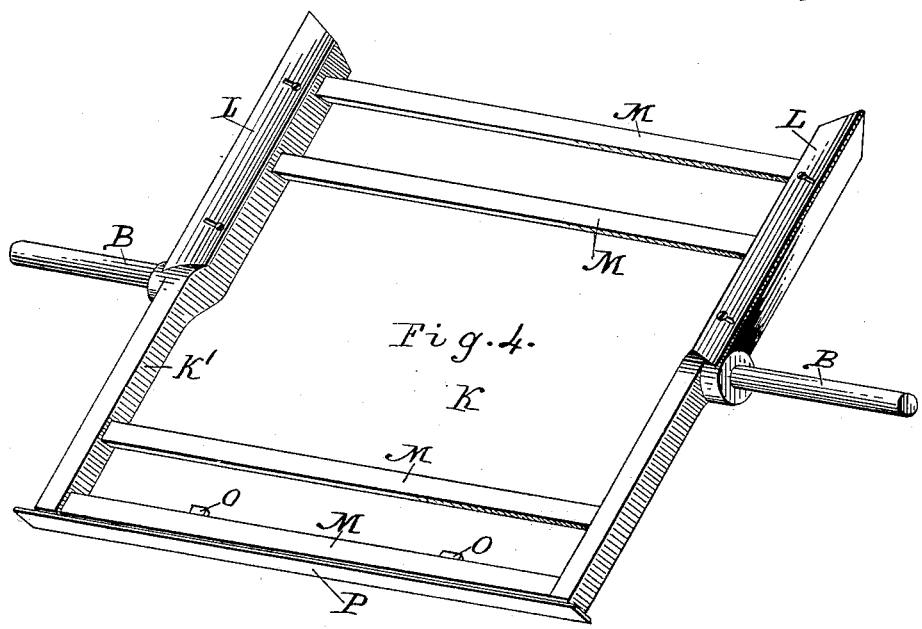
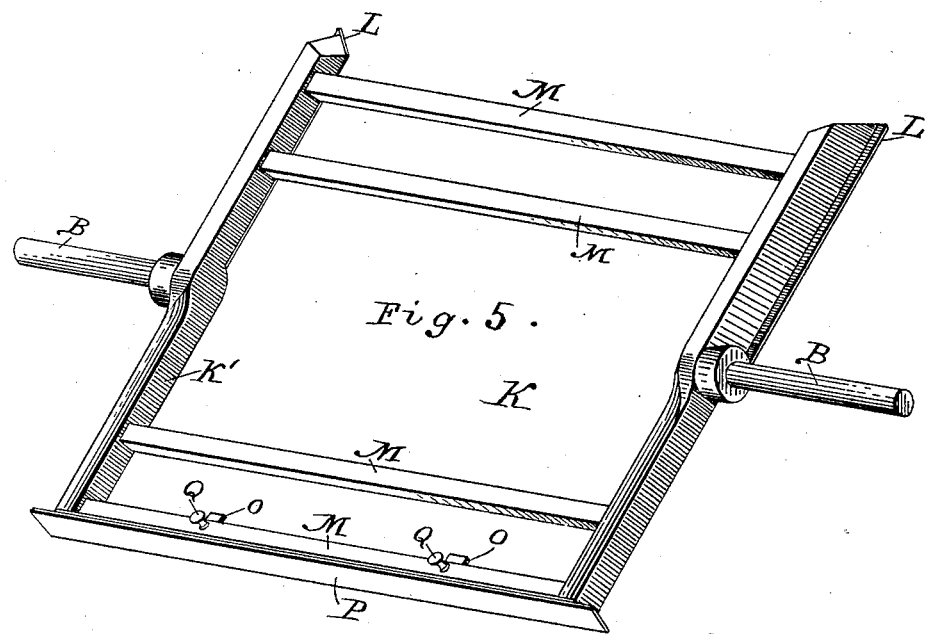
WITNESSES:
C. Sedgwick
A. H. Davis
INVENTOR:
J. G. Tourangeau
BY Munn & Co
ATTORNEYS.

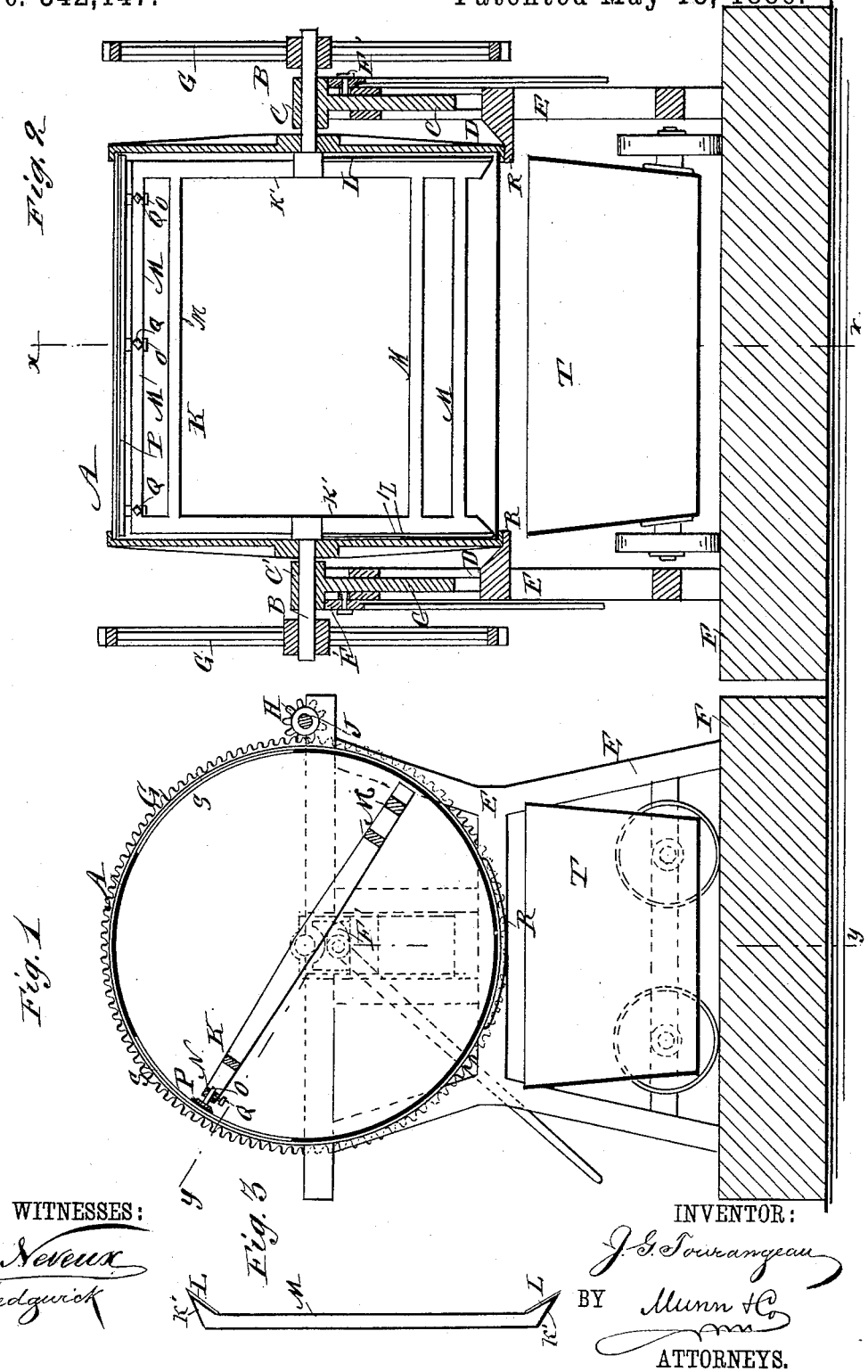

UNITED STATES PATENT OFFICE.

JOSEPH G. TOURANGEAU, OF QUEBEC, CANADA.

DOUGH-KNEADING MACHINE.

SPECIFICATION forming part of Letters Patent No. 342,147, dated May 18, 1886.

Application filed May 1, 1885. Serial No. 166,318. (No model.)

*To all whom it may concern:*

Be it known that I, JOSEPH G. TOURANGEAU, a resident of Quebec, in the Dominion of Canada, have invented a new and improved Dough-Kneading Machine, of which the following is a full, clear, and exact description.

The object of my invention is to provide a new and improved machine for kneading and working dough and other similar parts.

The invention consists in the construction and arrangement of parts, as will be hereinafter described and claimed.

Reference is to be had to the accompanying drawings, forming a part of this specification, in which similar letters of reference indicate corresponding parts in all the figures.

Figure 1 is a cross-sectional elevation of my improved dough-kneading machine on the line *x x*, Fig. 2. Fig. 2 is a longitudinal sectional elevation of the same on the line *y y*, Fig. 1. Fig. 3 is a detail view of part of the revolving frame carrying the blades. Figs. 4 and 5 are perspective views of the beater-frame.

Through the ends of a hollow cylindrical drum, A, the shafts B are passed, which are journaled in boxes C', formed on the upper ends of plates C, arranged to slide vertically in uprights D, held on the end-supporting frame E on a base, F. A cam-lever, F', is pivoted to each upright D, and the upper cam ends of the levers rest against the journal-boxes C', the levers projecting downward, as shown.

On the outer end of each shaft B a cog-wheel, G, is mounted, which wheels engage with pinions H on a shaft, J, journaled parallel with the drum on the frames E.

On the inner ends of the shafts B a quadrilateral frame, K, is secured in such a manner that it can revolve in the drum. This quadrilateral beater-frame K is composed of end bars, K', beveled in opposite directions above and below their centers, and cross-bars M M M M, that connect the end bars near their ends.

Each pair of cross-bars M are in practice placed about four inches apart, thus leaving the central part of the frame open and clear of obstruction. The beveled surface of the end bars, K', on one side of the center are provided with blades L, projecting beyond the outer edges of the end bars, in order to scrape off dough that may adhere to the ends of the cylinder carrying it inward. One cross-bar M of the frame uniting the end bars has apertures N for receiving lugs O, projecting from a blade, P, held on the said side bar adjacent to the inner surface of the drum. Binding-screws Q on the said bars hold the lugs O securely on the bars M.

Curved flanges R project from the inner sides of the frames E in such a manner that they can support the drum. The drum has openings S, which can be closed by suitable gates. A box, T, mounted on wheels, serves to receive the kneaded dough.

The operation is as follows: The yeast, flour, &c., are placed in the drum A, which rests upon the projections or flanges R, and the frame K is revolved in the drum. The frame K and bars M, passing through the dough, work it. The dough is pressed against the ends and inner surface of the drum and is again scraped off by the blades P and L. The boxes C' are then raised by means of the levers F', whereby the drum is raised off the flanges R and can be turned on the shafts B, so that the openings S will be at the bottom and the worked dough can drop through the said openings into the box T.

The openings in the drum are large and extend the entire length of the same, so that the attendant can see the dough drop and can watch the operation of the machine.

Having thus fully described my invention, I claim as new and desire to secure by Letters Patent—

1. In a dough-kneading machine, the open beater-frame K, consisting of end bars, connecting cross-bars, a transverse scraper having lugs passed through apertures in a cross-bar at one end of the frame, and set-screws for adjusting and holding said scraper at any desired point, the said end bars being provided at that side of their center opposite the transverse scraper with scraping-edges projecting laterally beyond the outer edges of the opposite half of the said end bars, substantially as described.

2. In a dough-kneading machine, the combination, with a supporting-frame, a cylinder resting thereon having a door or opening, and means for raising the cylinder, of a beater-frame within the cylinder, and shafts secured to the beater-frame for operating the same, and passed through the ends of the cylinder, whereby the dough may be kneaded by the beater and the cylinder raised and rotated to discharge the dough through its opening, substantially as set forth.

3. The combination of the frame E, uprights D, plates C, sliding therein, and bearings C' on the plates C, with the cam-levers F', adapted to raise the plates and their bearings, the vertically-movable dumping-cylinder A, supported by frame E, the beater-frame within the cylinder, and the shafts B, secured to the ends of the beater-frame for operating it, and passed through the ends of the cylinder and through the adjustable bearings C', whereby the cylinder and its contents and attachments will be raised vertically from the frame with the plates C by the cam-levers, substantially as set forth.

JOSEPH G. TOURANGEAU.

Witnesses:
A. G. BELLEAU,
C. E. LEMIEUX, Jr.